(12) United States Patent
Kornerup et al.

(10) Patent No.: US 7,725,874 B2
(45) Date of Patent: May 25, 2010

(54) COMBINATION STRUCTURE NODES FOR A GRAPHICAL PROGRAM

(75) Inventors: Jacob Kornerup, Austin, TX (US); Biren Shah, Austin, TX (US); Aljosa Vrancic, Austin, TX (US); Matthew Curtis, Austin, TX (US); Steve Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1318 days.

(21) Appl. No.: 11/203,816

(22) Filed: Aug. 15, 2005

(65) Prior Publication Data
US 2006/0053408 A1 Mar. 9, 2006

Related U.S. Application Data

(60) Provisional application No. 60/601,598, filed on Aug. 13, 2004, provisional application No. 60/601,692, filed on Aug. 13, 2004, provisional application No. 60/601,948, filed on Aug. 16, 2004.

(51) Int. Cl.
*G06F 9/44* (2006.01)

(52) U.S. Cl. .................. 717/105; 717/113; 717/114

(58) Field of Classification Search .............. 717/100, 717/104–113
See application file for complete search history.

(56) References Cited

U.S. PATENT DOCUMENTS

| 5,210,837 A | * | 5/1993 | Wiecek | 717/104 |
| 5,291,587 A | * | 3/1994 | Kodosky et al. | 703/2 |
| 5,313,575 A | * | 5/1994 | Beethe | 715/763 |
| 5,481,741 A | | 1/1996 | McKaskle et al. | |
| 5,610,828 A | | 3/1997 | Kodosky et al. | |
| 5,841,959 A | * | 11/1998 | Guiremand | 345/440 |

(Continued)

FOREIGN PATENT DOCUMENTS

GB 2272314 A * 5/1994

OTHER PUBLICATIONS

Browne et al., "Visual Programming and Debugging for Parallel Computing", IEEE, 1995, 9pgs.*

(Continued)

*Primary Examiner*—Wei Y Zhen
*Assistant Examiner*—Ryan D. Coyer
(74) *Attorney, Agent, or Firm*—Meyertons Hood Kivlin Kowert & Goetzel, P.C.; Jeffrey C. Hood

(57) ABSTRACT

A combination structure node is provided by a graphical programming development environment for use in a graphical program, where the combination structure node is operable to perform two or more control flow functions. For example, the combination structure node may be operable to perform two or more of: iteration, looping, conditional branching, sequencing, timed execution, event-driven execution, or other control flow functions. A user may include the combination structure node in a graphical program and associate a graphical code portion with the combination structure node. During execution of the graphical program, the combination structure node is operable to cause the associated graphical code portion to execute according to the two or more control flow functions performed by the combination structure node.

16 Claims, 14 Drawing Sheets

U.S. PATENT DOCUMENTS

| | | |
|---|---|---|
| 5,971,581 A | 10/1999 | Gretta |
| 6,802,053 B1 | 10/2004 | Dye et al. |
| 6,944,584 B1 * | 9/2005 | Tenney et al. .................. 703/22 |
| 7,010,470 B2 | 3/2006 | Kodosky et al. |
| 7,065,634 B2 | 6/2006 | Lewis et al. |
| 7,210,117 B2 * | 4/2007 | Kudukoli et al. ............ 717/100 |

OTHER PUBLICATIONS

Hirakawa et al., "Interpretation of Icon Overlapping in Iconic Programming", IEEE, 1991, 6pgs.*

Kacsuk et al., "Designing parallel programs by the graphical langauge GRAPNEL", Elsevier, 1996, 19pgs.*

* cited by examiner

COMBINATION STRUCTURE NODES FOR A GRAPHICAL PROGRAM

PRIORITY CLAIM

This application claims benefit of priority of U.S. provisional application Ser. No. 60/601,598 titled "Combination Structure Nodes in a Graphical Program," filed Aug. 13, 2004, whose inventors were Jacob Kornerup, Biren Shah, and Aljosa Vrancic.

This application also claims benefit of priority of U.S. provisional application Ser. No. 60/601,692 titled "Timed Sequence Structure and Timed Loop with Sequence Frames," filed Aug. 13, 2004, whose inventors were Jacob Komerup, Biren Shah, Aljosa Vrancic, Matthew C. Curtis, and Steven W. Rogers.

This application also claims benefit of priority of U.S. provisional application Ser. No. 60/601,948 titled "Graphical Programming System with Deterministic Communication," filed Aug. 16, 2004, whose inventors were Aljosa Vrancic and Jacob Komerup.

FIELD OF THE INVENTION

The present invention relates to the field of graphical programming, and more particularly to a graphical programming development environment that enables a combination structure node to be included in a graphical program, where the combination structure node is operable to perform two or more control flow functions.

DESCRIPTION OF THE RELATED ART

Traditionally, high level text-based programming languages have been used by programmers in writing application programs. Many different high level text-based programming languages exist, including BASIC, C, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

According to one embodiment of the invention, a first node may be included or displayed in a graphical program, where the first node is operable to perform two or more control flow functions. For example, the first node may be operable to perform two or more of: iteration, looping, conditional branching, sequencing, timed execution, event-driven execution, or other control flow functions.

A first graphical code portion may be associated with the first node, e.g., in response to user input. The first graphical code portion may comprise one or more graphical program nodes. The first node may be operable to cause the first graphical code portion to execute according to the two or more control flow functions during execution of the graphical program.

BRIEF DESCRIPTION OF THE DRAWINGS

A better understanding of the present invention can be obtained when the following detailed description of the preferred embodiment is considered in conjunction with the following drawings, in which.

Figure 1:
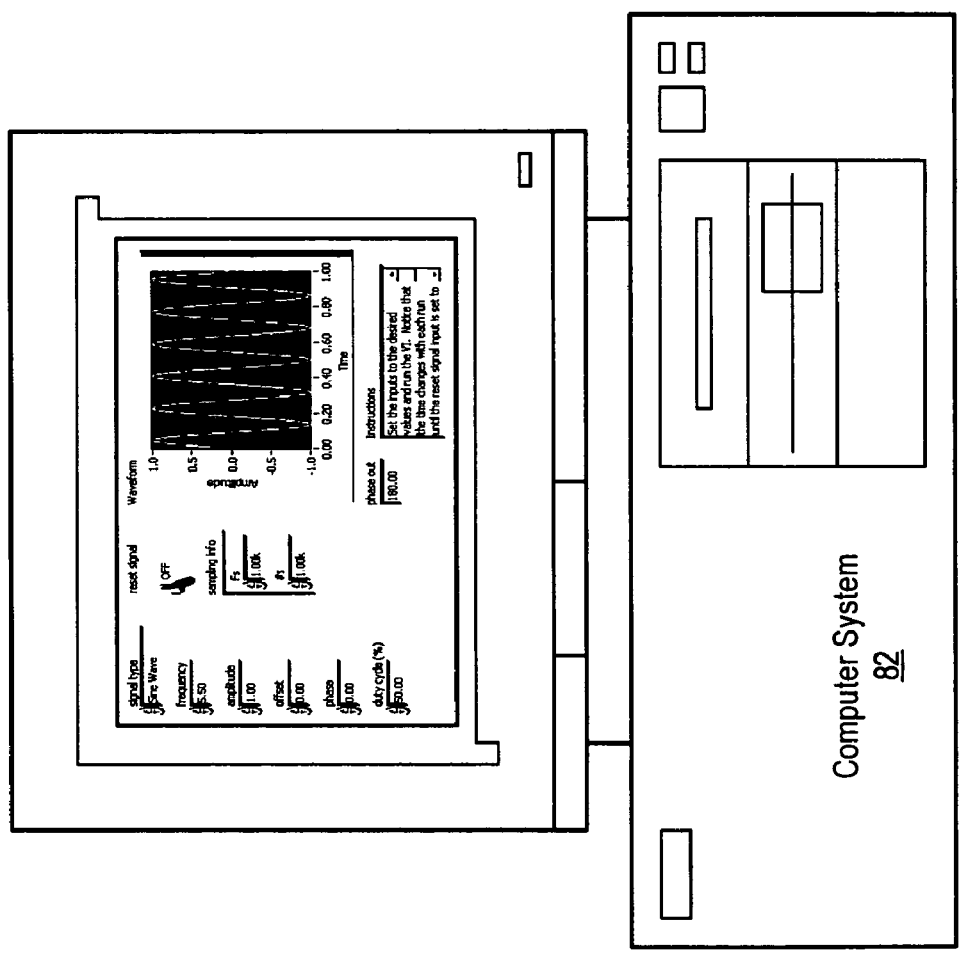
FIG. 1 illustrates an exemplary computer system operable to create and/or execute a graphical program that includes one or more combination structure nodes.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,901,221 titled "Graphical System for Modeling a Process and Associated Method," issued on Feb. 13, 1990.

U.S. Pat. No. 5,481,741 titled "Method and Apparatus for Providing Attribute Nodes in a Graphical Data Flow Environment".

U.S. Pat. No. 5,732,277 titled "Graphical Programming System and Method Which Includes Icons for Performing Iteration/Looping, Conditional Branching and Sequencing Operations," issued on Mar. 24, 1998.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/976,726 titled, "System and Method for Enabling a Graphical Program to Respond to User Interface Events," filed Oct. 12, 2001.

U.S. patent application Ser. No. 09/832,997 titled, "System and Method for Creating a Graphical Program Including a Plurality of Portions to be Executed Sequentially," filed Apr. 10, 2001.

U.S. patent application Ser. No. 10/892,829 titled, "A Graphical Program Which Executes a Timed Loop," filed Jul. 16, 2004.

U.S. provisional application Ser. No. 60/601,692 titled "Timed Sequence Structure and Timed Loop with Sequence Frames," filed Aug. 13, 2004.

U.S. provisional application Ser. No. 60/601,598 titled "Combination Structure Nodes in a Graphical Program," filed Aug. 13, 2004.

U.S. provisional application Ser. No. 60/601,948 titled "Graphical Programming System with Deterministic Communication," filed Aug. 16, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Various embodiments of the present invention relate to a system and method for creating a graphical program. A user may interact with a graphical programming development environment application to create a graphical program. In one embodiment the graphical programming development environment may be a graphical data flow programming system that allows the user to create a graphical data flow program. A graphical data flow program comprises a block diagram that includes a plurality of nodes connected by connections or "wires", wherein the connections indicate that data produced by one node is used by another node.

One example of data flow semantics is that the nodes of the graphical data flow program operate such that the order of operations is implied by or controlled by data interdependencies among the nodes.

Another example of data flow semantics is that the nodes of the graphical data flow program obey the following semantic principles:

the order of operations is not completely specified by the user;

the order of operations is implied by data interdependencies;

a node in the graphical data flow program executes after all necessary inputs have become available.

A graphical data flow program may also include one or more nodes that do not completely follow data flow semantic principles, i.e., nodes providing functionality or capabilities that do not adhere to data driven execution. These nodes may be referred to as "structure nodes" or "control flow nodes". For example, these nodes may support various types of control flow (or execution flow), as opposed to data flow, such as iteration, looping, conditional branching, sequencing, event-driven execution, and other non-data flow behavior.

As one example, the LabVIEW graphical programming environment includes a While Loop structure node, a For Loop structure node, a Sequence structure node, and a Case structure node. In the While Loop structure node, graphical code associated with the While Loop structure node repeatedly executes for a plurality of iterations while a condition is true. In the For Loop structure node, graphical code associated with the For Loop structure node executes for a predetermined number of iterations set by the user. In the Sequence structure node, the user can specify different portions of graphical code to execute according to a desired sequence, without regard to data flow principles. In the Case structure node, different portions of graphical code may execute dependent on a condition. For more information on structure nodes in LabVIEW, please see U.S. Pat. Nos. 4,901,221 and 5,732,277, which are hereby incorporated by reference in their entirety as though fully and completely set forth herein.

Other examples of structure nodes are present in the Simulink program offered by The MathWorks, including a While Iterator block that runs blocks in a subsystem until a while-iterator condition is false or a maximum number of iterations is reached, a For Iterator block that runs blocks in a subsystem for a specified number of iterations, a Function-Call Generator block that implements an iterator operation, and a Stateflow block.

In general, a structure node may perform any of various types of control flow functions. As used herein, a control flow function refers to a function that is not performed in accordance with strict data flow principles, such as iteration, looping, conditional branching, sequencing, timed execution, and event-driven execution. Other exemplary types of control flow functions are described below.

A graphical code portion, i.e., one or more nodes, may be associated with a structure node, typically in a visual fashion, to indicate that this graphical code is executed according to the control flow function performed by the structure node. In other words, execution of the nodes in the graphical code portion associated with the structure node is controlled by the structure node, whereas execution of graphical code that is not associated with the structure node is not controlled by the structure node, but instead follows normal data flow principles.

Execution of the graphical code portion associated with the structure node may be controlled in any of various ways, depending on the control flow function performed by the structure node. It is noted that once the execution of the graphical code portion associated with the structure node has begun, the graphical code portion may execute according to data flow principles. For example, in the case of a While Loop structure node, nodes in the graphical code portion associated with the While Loop structure node may execute according to data flow principles during each iteration of the loop. However, the While Loop controls the overall execution of the graphical code portion and causes the iteration to occur, whereas iteration does not normally occur in a data flow program.

It is also noted that various structure nodes may obey data flow principles at their inputs and outputs. For example, a structure node itself may be connected to other nodes in a graphical program according to a data flow format. As one example, a function node may be connected to an input terminal of a For Loop structure node, where the function node outputs an integer value used to specify the desired number of iterations for the For Loop. As another example, data produced by the graphical code portion associated with the For Loop may be passed as output to other nodes in the graphical program.

The following list describes several exemplary structure nodes. This list is not intended to be exhaustive, but simply represents exemplary control flow functions performed by structure nodes in graphical programs.

While Loop structure node—A While Loop structure node enables the user to configure the graphical program to perform a loop that executes an associated graphical code portion until a certain condition becomes true.

For Loop structure node—A For Loop structure node enables the user to configure the graphical program to perform a loop that executes an associated graphical code portion for a fixed number of iterations.

Timed Loop structure node—A Timed Loop structure node enables the user to configure the graphical program to perform a timed loop, i.e., a loop that executes an associated graphical code portion with a precisely controlled execution period.

Event structure node—An Event structure node enables the user to configure the graphical program to perform event-driven execution, e.g., by configuring an associated graphical code portion to receive and respond to one or more events.

Sequence structure node—A Sequence structure node enables the user to specify sequencing for an associated graphical code portion. For example, the graphical code portion may be organized as sub-portions such that the Sequence structure node defines a sequential order of execution for each of the sub-portions.

Timed Sequence structure node—A Timed Sequence structure node enables the user to configure the graphical program to perform timed sequencing for an associated graphical code portion. For example, the graphical code portion may be organized as sub-portions such that the Timed Sequence structure node defines a sequential order of execution for each of the sub-portions and also precisely controls the timing of the sub-portions, e.g., so that each sub-portion begins at a desired time and/or finishes within a desired time bound.

Conditional Branching structure node—A Conditional Branching structure node enables the user to configure the graphical program to perform conditional branching for an associated graphical code portion. As one example, the graphical code portion may be organized as sub-portions such that the Conditional Branching structure node selects one of the sub-portions to execute, depending on the evaluation of a condition.

State Machine structure node—A State Machine structure node enables the user to configure an associated graphical code portion to model a state machine.

Synchronous Data Flow structure node—A Synchronous Data Flow structure node enables the user to configure an associated graphical code portion to implement synchronous data flow.

Simulation structure node—A Simulation structure node enables the user to configure an associated graphical code portion to perform a simulation of a system.

The above list simply provides a brief overview of the control flow functions performed by several exemplary types of structure nodes. Other types of structure nodes may perform any of various other types of functionality or control flow that normally would not be associated with a strict data flow diagram. Various types of structure nodes may implement any of various other programming constructs or enable any of various other computation models.

It should be apparent from the description above that structure nodes are not limited to implementing well-known programming constructs such as iteration, conditional branching, or sequencing. Various kinds of structure nodes may enable the user to configure a graphical code portion to behave according to any computation model. Some structure nodes may implement programming constructs or enable computation models that are complex or are specialized for particular types of applications. As one example, a graphical programming development environment may provide structure nodes for modeling state machines, for controlling synchronous dataflow, for performing a simulation of a system, etc.

Each type of structure node supported by the graphical programming development environment may have a defined semantics and may be configured to specify its exact behavior. For example, a user may configure a structure node by connecting various wires to terminals on the structure node and/or by interacting with a configuration dialog to specify various properties for the structure node.

Combination Structure Nodes

For many applications, a user needs to configure a graphical program with two or more structure nodes that act in combination with each other. In particular, many graphical programs include two (or more) structure nodes configured in a nested fashion such that one structure node acts as an outer structure node and another structure node acts as an inner structure node. In other words, the inner structure node may operate or may execute "inside" the outer structure node. As one example, a sequence structure node may be placed inside a while loop structure node such that on each iteration of the while loop, the sequence structure node operates to control the execution of a series of sub-tasks.

In prior art graphical programming development environments, structure nodes that were combined or nested in this manner in a graphical program had to be included in the graphical program as separate structure nodes. For example, the user would typically include a first structure node in the graphical program and also include a second structure node in the graphical program, and would then separately configure each of the structure nodes.

According to one embodiment of the present invention, the graphical programming development environment may provide one or more "combination structure nodes". As used herein, a combination structure node refers to a structure node operable to perform two or more control flow functions. Various types of combination structure nodes may perform any types of control flow functions. For example, a combination structure node may be operable to perform two or more of: iteration, looping, conditional branching, sequencing, timed execution, and event-driven execution. As one example, a combination structure node may be operable to perform both iteration and sequencing, e.g., to cause an associated graphical code portion to execute for multiple iterations, where on each iteration, a plurality of sub-portions in the graphical code portion are executed according to a defined sequential order. Other exemplary types of combination structure nodes are described below.

In one embodiment, a single combination structure node may combine the functionality or semantics of two or more structure nodes, or may combine the programming constructs or computation models represented by each of the two or more structure nodes. For example, the graphical programming development environment may provide one structure node operable to perform a first control flow function and another structure node operable to perform a second control flow function. A combination structure node may combine functionality of these two structure nodes into a single node, e.g., by performing both the first control flow function and the second control flow function.

FIG. 1—Computer System

Referring now to FIG. 1, a computer system 82 operable to execute a graphical program is illustrated. The graphical program may be configured to include a combination structure node, as described in detail below. As shown in FIG. 1, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

Figure 1A:
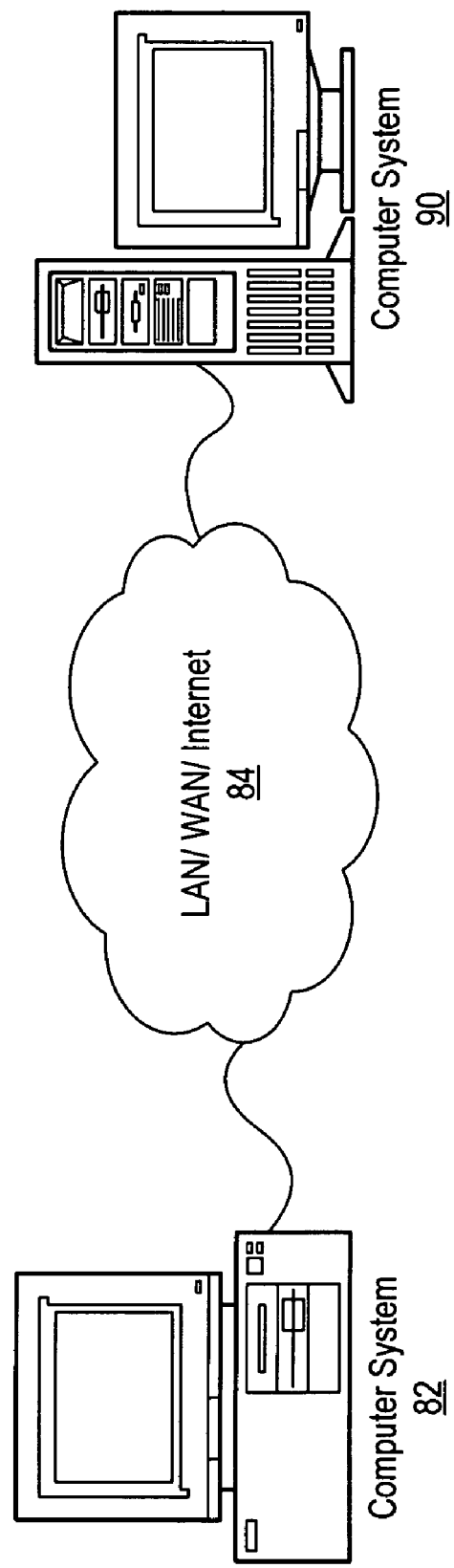
FIG. 1A illustrates an embodiment in which the computer system of FIG. 1 is coupled to another computer system via a network.

As shown in FIG. 1A, in one embodiment the computer system 82 may be coupled to another computer system 90 via a network. The computer systems 82 and 90 may operate together to perform various operations.

The computer system 82 may include a memory medium (s) on which one or more computer programs or software components according to one embodiment of the present invention may be stored. For example, the memory medium may store one or more graphical programs configured to include combination structure nodes as described below. Also, the memory medium may store a graphical programming development environment application used to create such graphical programs and/or an execution subsystem used to execute the graphical programs. The memory medium may also store operating system software, as well as other software for operation of the computer system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where a graphical program that includes a combination structure node may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, graphical programs as described herein may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
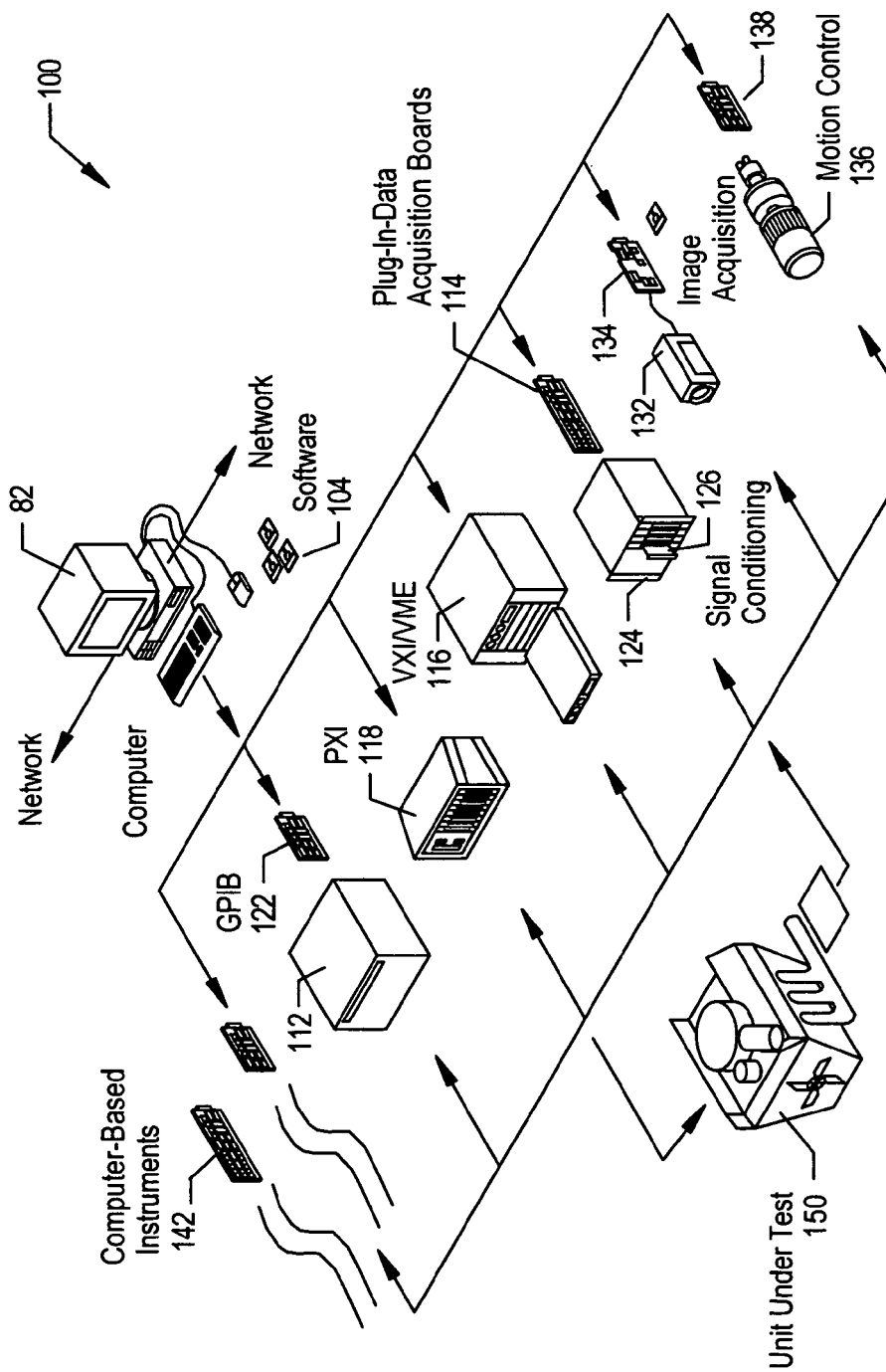
FIG. 2A illustrates an instrumentation control system according to one embodiment.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown.

The computer 82 may operate with the one or more instruments to analyze, measure or control a unit under test (UUT) or process 150. In one embodiment the computer 82 may execute a graphical program involved with the instrumentation control system 100, where at least a portion of the functionality of the graphical program is controlled by a combination structure node.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among other types of applications.

Figure 2B:
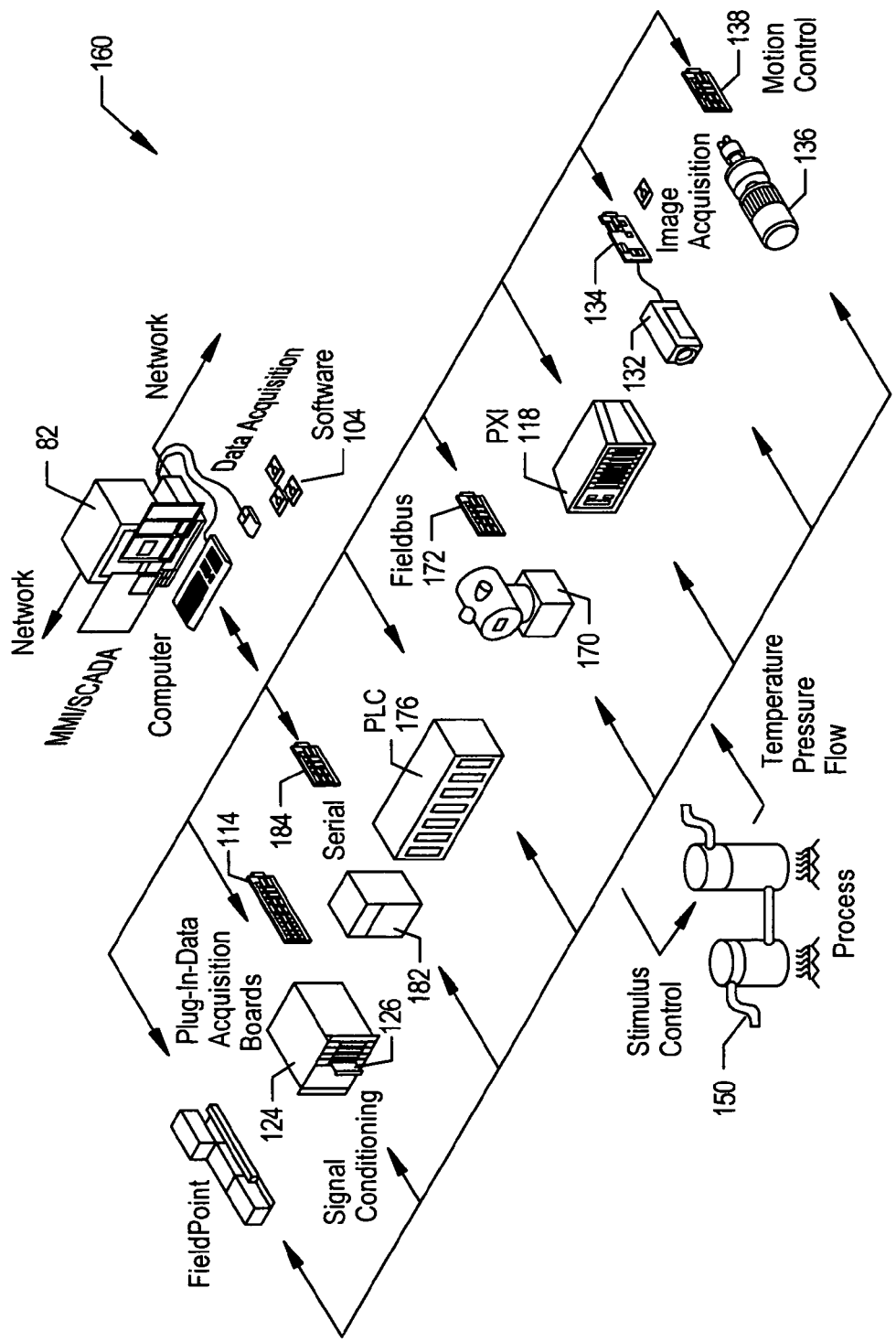
FIG. 2B illustrates an industrial automation system according to one embodiment.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown.

The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment the computer 82 may execute a graphical program involved in performing the automation function, where at least a portion of the functionality of the graphical program is controlled by a combination structure node.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
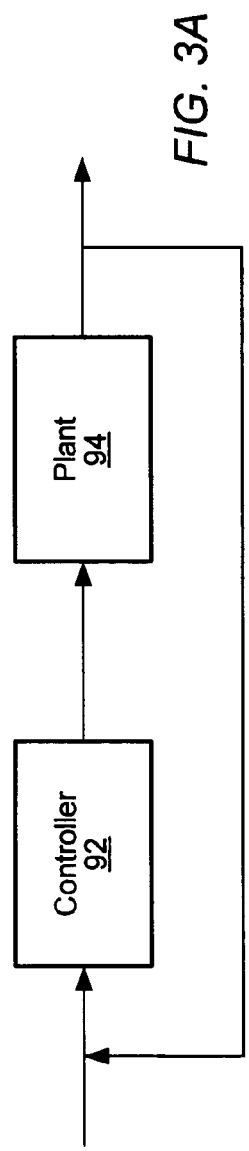
FIG. 3A is a high level block diagram of an exemplary system which may execute or utilize a graphical program that includes a combination structure node.

FIG. 3A is a high level block diagram of an exemplary system which may execute or utilize a graphical program that includes a combination structure node. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) The user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
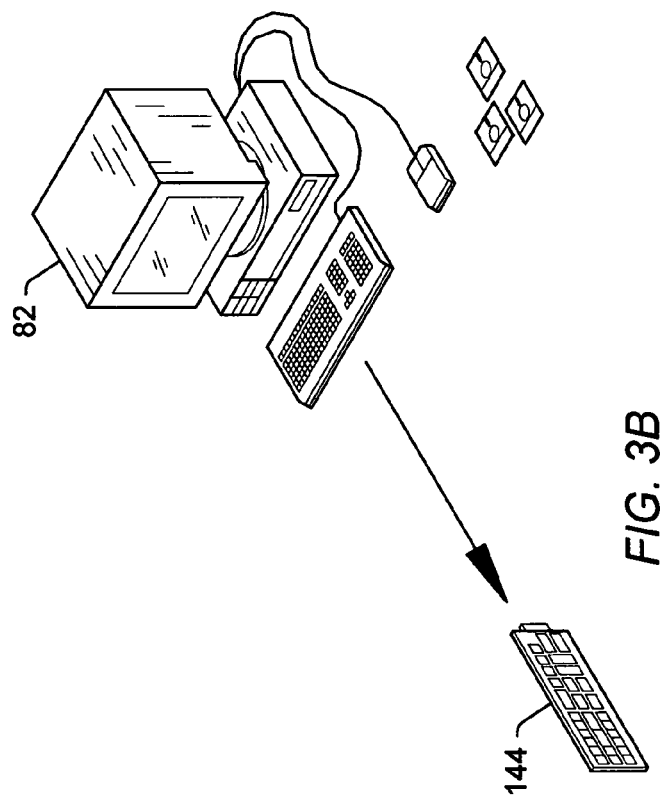
FIG. 3B illustrates an exemplary system which may perform control and/or simulation functions utilizing a graphical program that includes a combination structure node.

FIG. 3B illustrates an exemplary system which may perform control and/or simulation functions utilizing a graphical program that includes a combination structure node. As shown, the controller 92 may be implemented by a computer system 82 or other device 144 (e.g., including a processor and memory medium and/or including a programmable hardware element) that executes or implements a graphical program. In a similar manner, the plant 94 may be implemented by a computer system 82 or other device 144 (e.g., including a processor and memory medium and/or including a programmable hardware element) that executes or implements a graphical program, or may be implemented by a real physical system, e.g., a car engine.

In one embodiment, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system 82 or other device 144. The computer system 82 may be a platform that supports real time execution, e.g., a device including a processor that executes a real-time operating system (RTOS), or a device including a programmable hardware element.

In one embodiment, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 believe that it is connected to a real plant, e.g., a real engine.

In the embodiments of FIGS. 2A, 2B, and 3B above, one or more of the various devices may couple to each other over a network, such as the Internet, an Intranet, or a LAN. In one embodiment, the user operates to select a target device from a plurality of possible target devices for programming or configuration using a graphical program. Thus, the user may create a graphical program on a computer and use (execute) the graphical program on that computer or may deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A, 2B, and 3B, may be referred to as virtual instruments.

Figure 4:
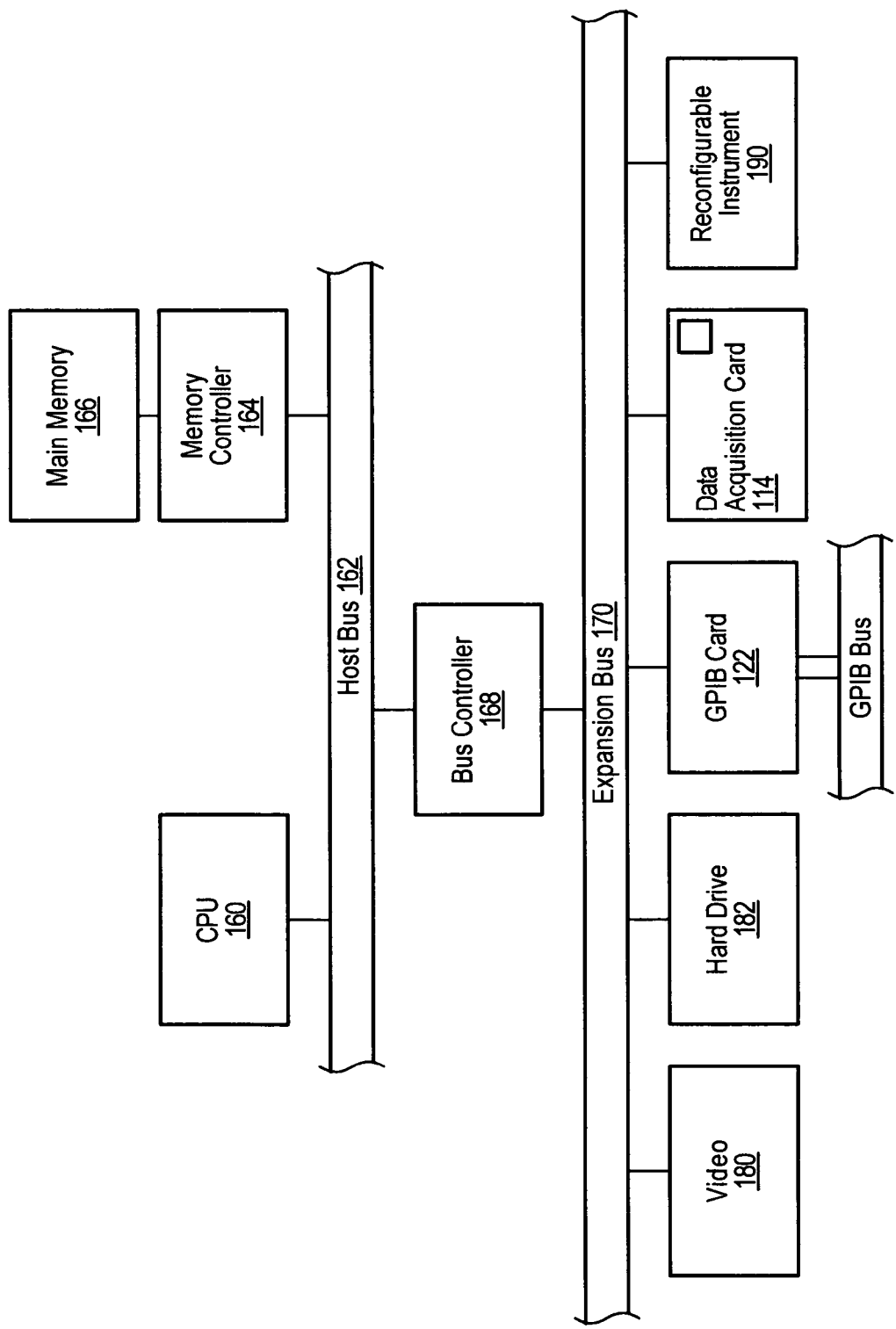
FIG. 4 is an exemplary block diagram of the computer system illustrated in FIGS. 1, 1A, 2A, 2B, and 3B.

FIG. 4—Computer System Block Diagram

FIG. 4 is a block diagram representing one embodiment of the computer system 82 illustrated in FIGS. 1, 1A, 2A, 2B, or 3B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a graphical program that includes one or more combination structure nodes as described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. In the illustrated embodiment, the computer 82 further comprises a video display subsystem 180 and hard drive 182 coupled to the expansion bus 170.

As shown, a device 190 may also be connected to the computer. In one embodiment the device 190 may include a processor and memory which execute a real time operating system. In another embodiment the device 190 may also or may instead include a programmable hardware element. In one embodiment the computer system 82 may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code that was generated from either the graphical program or from text code that in turn was generated from the graphical program.

Utilizing a Combination Structure Node in a Graphical Program

Figure 5:
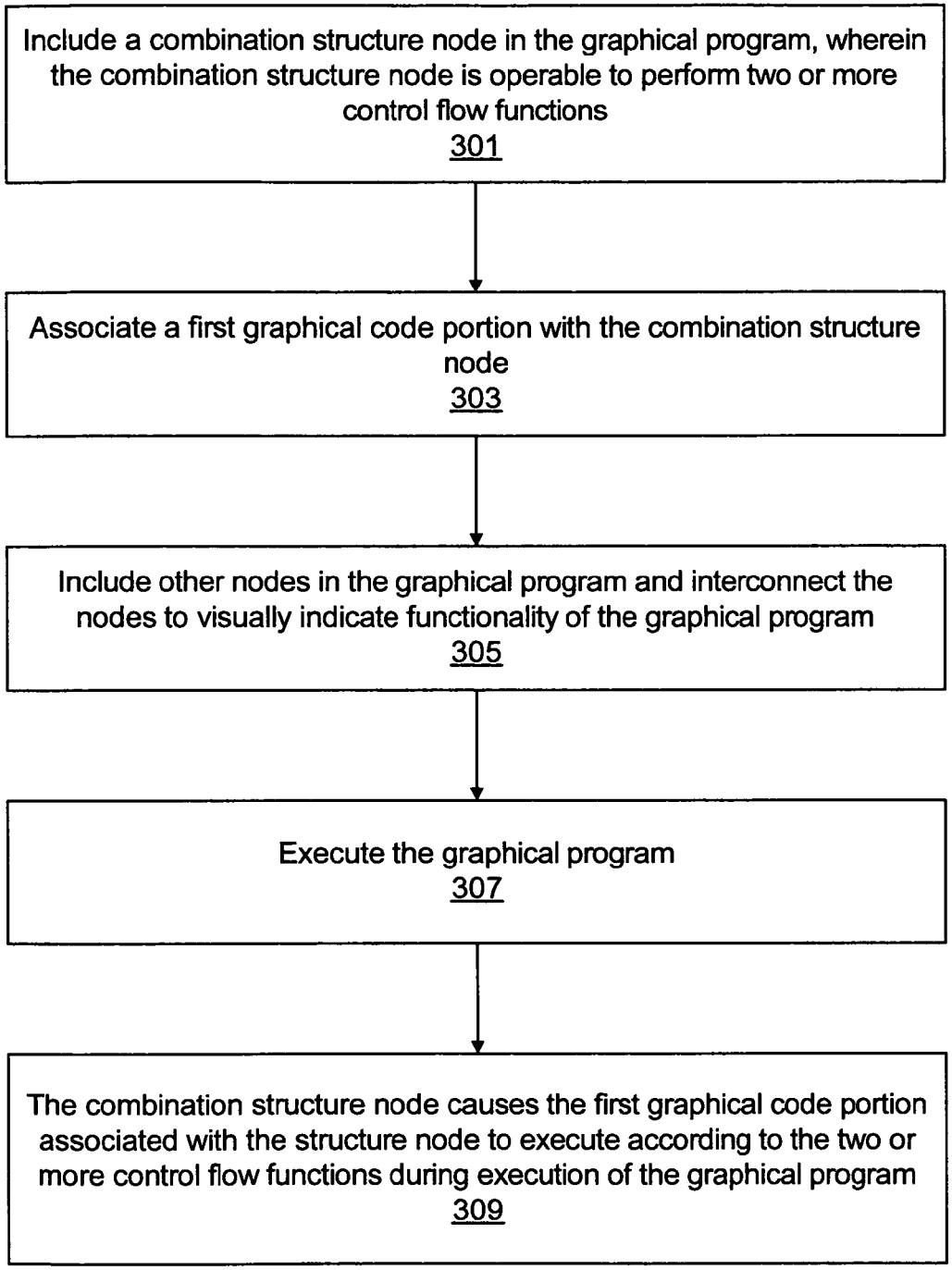
FIG. 5 is a flowchart diagram illustrating one embodiment of a method for utilizing a combination structure node in a graphical program.

FIG. 5 is a flowchart diagram illustrating one embodiment of a method for utilizing a combination structure node in a graphical program. It is noted that FIG. 5 illustrates a representative embodiment, and alternative embodiments are contemplated. Also, various elements may be combined, omitted, or performed in different orders.

In 301, a combination structure node may be included or displayed in the graphical program, e.g., in a block diagram of the graphical program. For example, a graphical programming development environment may provide access to various types of nodes available for inclusion in the graphical program, and the combination structure node may be included in the graphical program in response to a user request. For example, the user may drag and drop the combination structure node from a palette into the graphical program, utilize a menu command to request the combination structure node to be included in the graphical program, or perform any of various other actions to cause the combination structure node to be included in the graphical program.

In 303, a first graphical code portion may be associated with the combination structure node, e.g., in response to user input. As described above, the combination structure node may be operable to perform two or more control flow functions and may cause the first graphical code portion to execute according to the two or more control flow functions during execution of the graphical program.

The first graphical code portion may comprise one or more graphical program nodes. For example, the one or more nodes in the first graphical code portion may be operable to perform a particular function or procedure. In one embodiment, the nodes in the first graphical code portion may be interconnected so as to visually indicate functionality of the graphical code portion. In one embodiment the first graphical code portion associated with the combination structure node may include two or more sub-portions. Each of the sub-portions may comprise one or more nodes, where the nodes may be interconnected to visually indicate functionality of the sub-portion.

In various embodiments, any of various techniques may be used to associate the graphical code portion with the combination structure node. In one embodiment, a combination structure node may have an interior portion, and the graphical code portion may be placed inside the interior portion of the combination structure node to specify that the graphical code portion is executed according to the control flow functions performed by the combination structure node. Combination structure nodes may also include other mechanisms to visually indicate which graphical code is associated with the combination structure node, such as a wire mechanism. For example, a combination structure node may be wired to a sub diagram, indicated that the graphical code of the sub-diagram is executed according to the control flow functions performed by the combination structure node. In another embodiment, the graphical code portion associated with the combination structure node may not be visually indicated in the graphical program. For example, the user may simply interact with a configuration dialog to specify a file representing a graphical code portion to associate with the combination structure node.

In 305, other nodes may be included or displayed in the graphical program. For example, in addition to the combination structure node, the user may also include other nodes that perform various functions. The user may interconnect nodes in the graphical program so that the interconnected nodes visually indicate functionality of the graphical program. In one embodiment, the nodes in the graphical program may be connected according to a data flow format, where a connection between two nodes visually indicates that data produced by one node is used by another node.

In one embodiment, one or more of the nodes included in 305 may be connected to the combination structure node. For example, one or more of the nodes included in 305 may provide input data to the combination structure node or may receive output data from the combination structure node.

In 307 the graphical program may be executed. Executing the graphical program may comprise executing the nodes in the graphical program. As described above, the nodes in the graphical program may be connected according to a data flow format. Thus, each node may execute when its data inputs (if any) have arrived from other nodes. After executing, output data from the node may then be passed to other nodes. However, execution of the nodes in the first graphical code portion associated with the combination structure node may instead be governed by the combination structure node. In particular, the combination structure node causes the first graphical code portion associated with the combination structure node to execute according to the two or more control flow functions performed by the combination structure node, as indicated in 309.

The combination structure node may appear to the user as a single structure node. In other words, the two or more control flow functions combined by the combination structure node may be tightly integrated so that they act as a single structure node. For example, the user may perform a single action to include the combination structure node in the graphical program, e.g., by dragging and dropping the combination structure node from a palette into the graphical program. In contrast, prior art methods for including two or more structure nodes as separate nodes in the graphical program typically require the user to perform a separate action to include each structure node in the graphical program. For example, in the prior art, a user may drag and drop a first structure node into the graphical program and may then drag and drop a second structure node into the graphical program.

A combination structure node may also be sizeable within the graphical program as a single structure node. For example, the user may drag a border of the combination structure node to re-size the combination structure node to a desired size within the graphical program. If the combination structure node combines the functionality of separate structure nodes then the combination structure node may integrate the visual appearance of the separate structure nodes which it combines so that they appear as a single structure node. In contrast, when structure nodes are separately included in a graphical program as known in the prior art, it is readily apparent to the user that they are separate structure nodes. For example, separate structure nodes need to be re-sized separately from each other.

A combination structure node may also simplify the user's task of configuring the graphical program to perform the desired computation model. For example, the user may be able to specify various information or properties or perform other actions to configure the combination structure node as a whole, where the user would otherwise have been required to specify redundant information or perform an increased number of actions to configure structure nodes included in the graphical program as separate nodes. As one example, consider a combination structure node that combines a timed loop control flow function and a timed sequence control flow function. The user may be able to set a single property to specify a timing source to control timing of both the loop and the sequence instead of having to specify the timing source for the loop and the sequence separately. Reducing the amount of configuration that the user has to perform may result in a more understandable graphical program, both from a semantic perspective and a readability perspective.

Integrating two or more control flow functions in a single combination structure node may provide performance advantages for the graphical program as well. For example, the graphical programming development environment may be able to generate more appropriate or better-performing code for the combination structure node.

Figure 6:
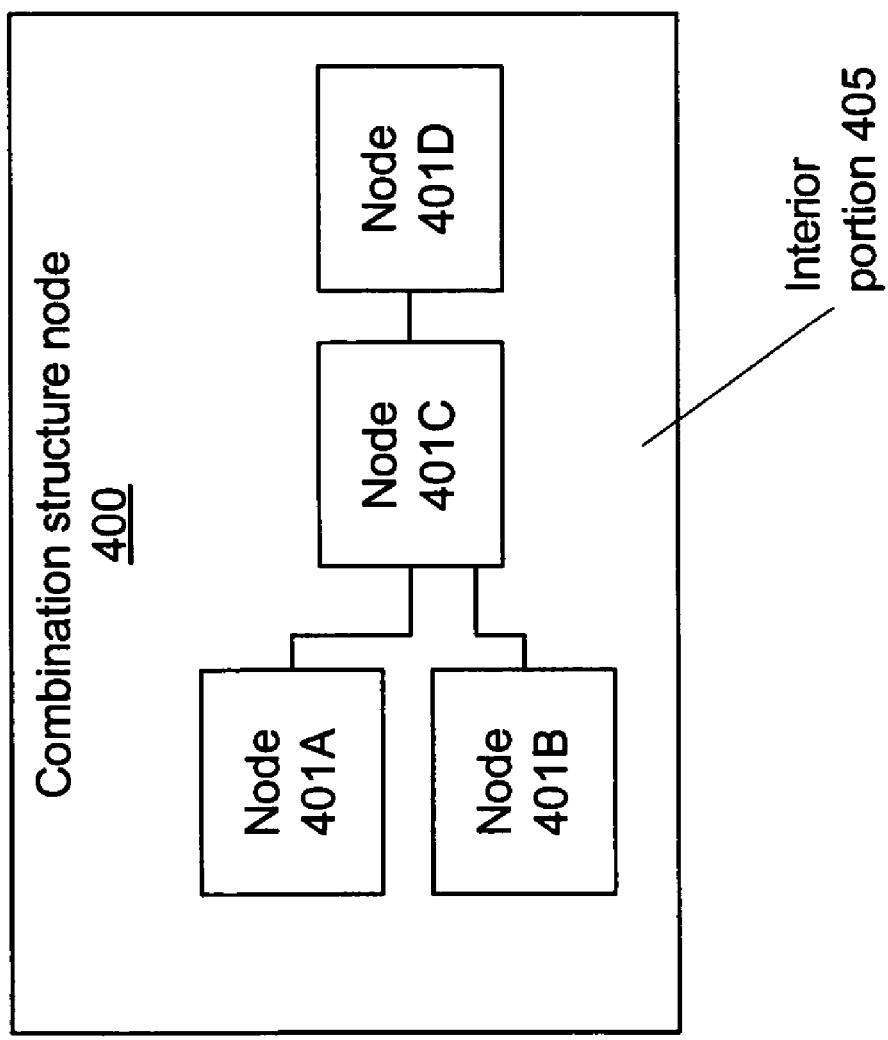
FIGS. 6-8 illustrate several exemplary embodiments of combination structure nodes.
Figure 7:
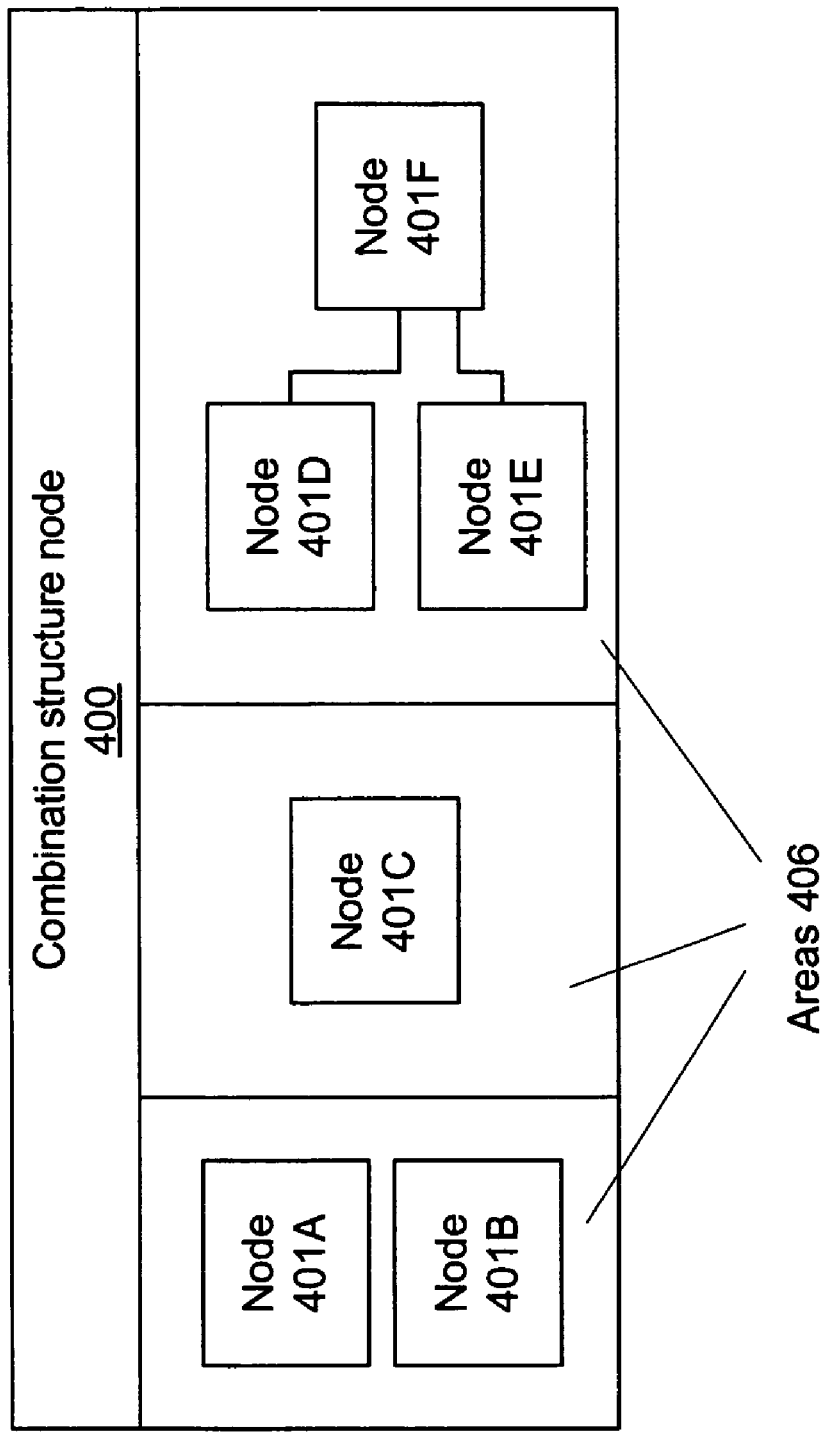
Figure 8:
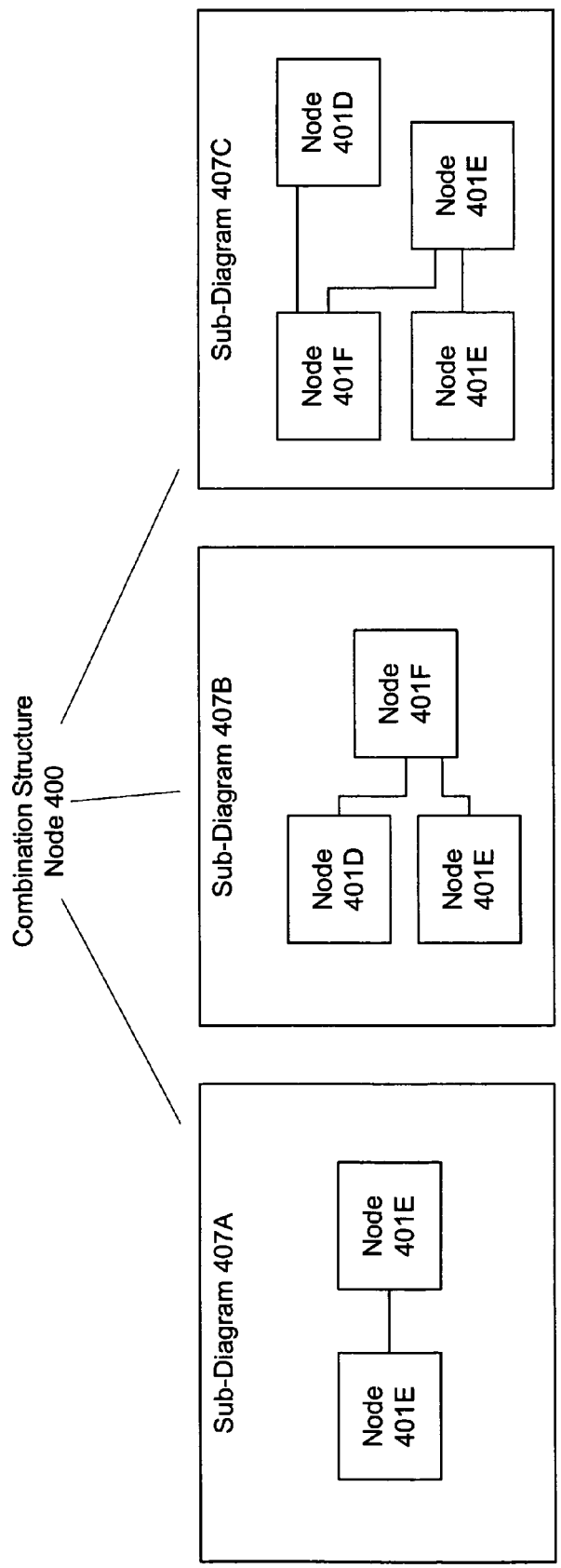

FIGS. 6-8 illustrate several exemplary embodiments of combination structure nodes. In the embodiment illustrated in FIG. 6, a combination structure node 400 includes an interior portion 405. A user may associate a graphical code portion with the combination structure node 400 may placing it inside the interior portion 405. For example, nodes 401A-401D are shown in the interior portion 405 in FIG. 6. This may visually indicate to the user that the combination structure node 400 causes the nodes 401A-401D to execute in accordance with the control flow functions performed by the combination structure node 400.

In one embodiment, a combination structure node 400 may include a plurality of areas 406, e.g., as illustrated in FIG. 7. In this embodiment, the graphical code portion associated with the combination structure node 400 may be organized into sub-portions, where each sub-portion is placed inside one of the areas 406. The areas 406 may take on any of various appearances, and may have any size or spatial relationship with each other, e.g., so as to appropriately illustrate the semantics of the combination structure node. As one example, a combination structure node may be operable to perform both iteration and sequencing, e.g., to cause an associated graphical code portion to execute for multiple iterations, where on each iteration, a plurality of sub-portions in the graphical code portion are executed according to a defined sequential order. In this example, the areas 406 may appear as frames, where each sub-portion of graphical code is placed in one of the frames, and the frames visually indicate that the sub-portions are executed sequentially in a particular order.

In one embodiment, a combination structure node 400 may include a plurality of sub-diagrams 407, as illustrated in FIG. ciated with the combination structure node 400 by placing them inside an interior portion of the combination structure node 400 to visually indicate that their execution is controlled by the combination structure node 400. Nodes not inside the interior portion of the combination structure node 400 do not execute according to the control flow functions performed by the combination structure node 400.

In various embodiments a combination structure node may combine any kinds of separate control flow functions or separate structure nodes. In one embodiment a combination structure node may combine two structure nodes of the same type. For example, a combination structure node may combine two While loop structure nodes such that the combination structure node implements a nested While loop.

In another embodiment a combination structure node may combine two structure nodes of different types. For example, a combination structure node may combine a While loop structure node and an event structure node such that each iteration of the While loop is operable to receive and respond to events.

The following table illustrates several exemplary matings which combination structure nodes may implement. In each of these examples, the respective combination structure node combines an outer structure node and an inner structure node such that the inner structure node is nested within the outer structure node.

| Outer structure | Inner Structure | Description/usage |
| --- | --- | --- |
| Timed Loop | Timed Sequence | Timed repetition of timed stages |
| Timed Loop | Event structure | Timed repetitive handling of UI and user events |
| While Loop | Event structure | Repetitive handling of UI and user events |
| While Loop | Timed/untimed Sequence | Repetition of timed/untimed stages |
| For Loop | For Loop | Handling of 2 (or N in general) dimensional arrays in a single structure |
| For Loop | Case statement | Iterate over sequence of values (in an array) and choose th right case based on value |
| For Loop | Simulation Structure | Iterate over a range of simulation parameters, like time-steps, in an array |
| For Loop | Timed/untimed Sequence | Iterate over sequence of values (in an array) and execute |
| Simulation Structure | Timed/untimed Sequence | Divide each time-step into (timed) phases. E.g.: input, logi output |
| Case statement | Timed/untimed Sequence | Select the sequence to execute, based on selector value. |
| Timed/untimed Sequence | While loop in frame i | Repeatedly execute frame i, until stop condition is met |
| Timed/untimed Sequence | For loop in frame i | Repeatedly execute frame i, for N iterations |
| Timed/untimed Sequence | Case statement in frame i | Select the appropriate diagram to execute in frame i |
| Timed/untimed Sequence | Timed Loop | Repeatedly execute frame i, until stop condition is met, according to timing |
| Timed/untimed Sequence | Simulation Structure | Frame i is a simulation |

8. The graphical code portion associated with the combination structure node 400 may be organized into sub-portions, where each sub-portion is placed inside one of the sub-diagrams 407. In one embodiment, only one of the sub-diagrams may be visible at a time, and the user may switch between the sub-diagrams as desired. In another embodiment, the user may be able to view two or more of the sub-diagrams simultaneously.

Figure 9:
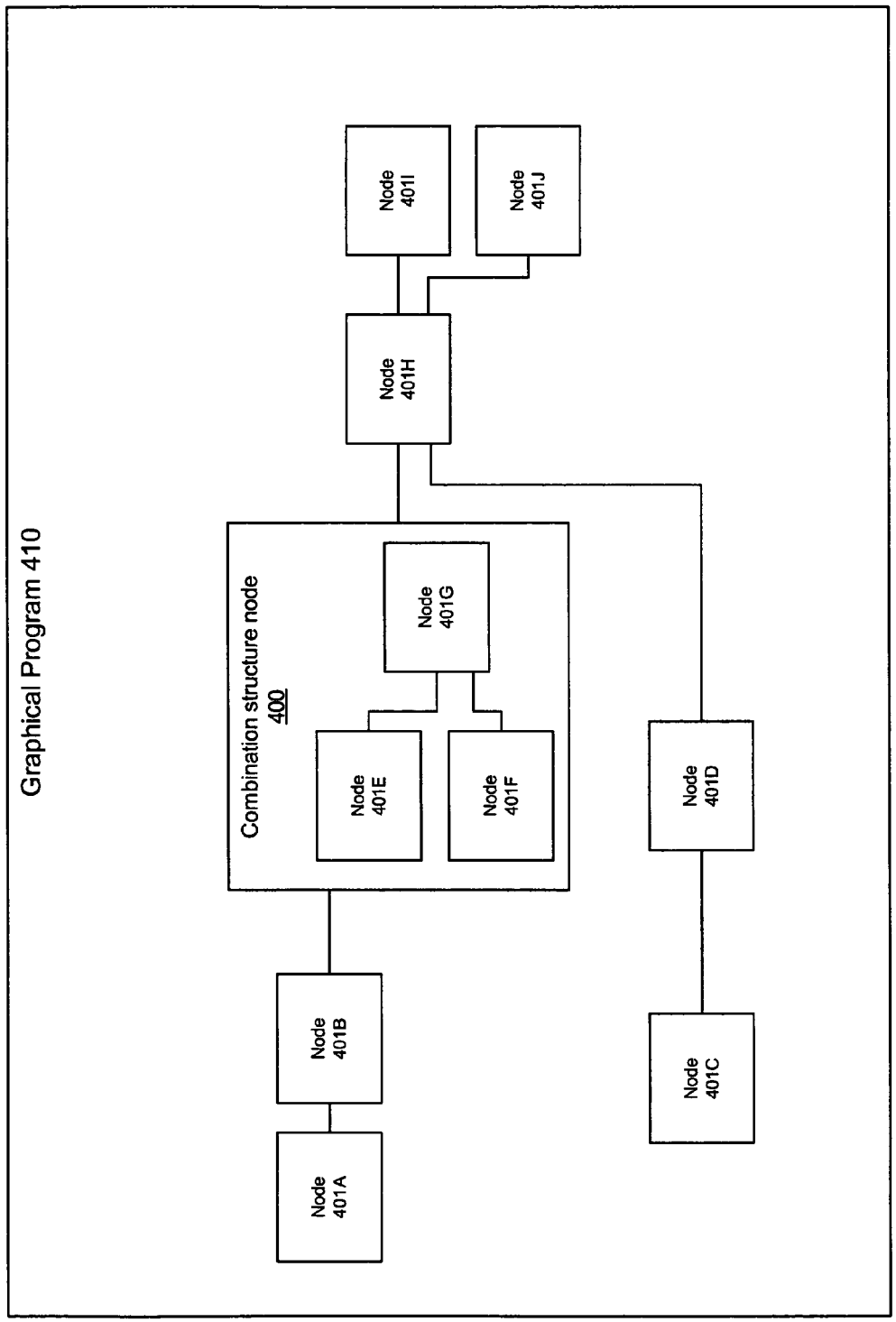
FIG. 9 illustrates an exemplary graphical program in which a combination structure node has been included.

FIG. 9 illustrates an exemplary graphical program 410 in which a combination structure node 400 has been included. In this example, nodes 401E, 401F, and 401G have been asso- As illustrated by the table above, there are many potential kinds of combination structure nodes. Also, although the table lists only combinations of two structure nodes, combination structure nodes that combine the functionality or semantics of three or more structure nodes are also contemplated.

In another embodiment the user may first include a structure node in the graphical program and may then select a menu option or provide other input to cause the structure node to be automatically changed to a combination structure node. For example, the user may first include a While loop structure node in the graphical program and may then request that the While loop structure node be combined with a sequence structure node. In response the graphical programming development environment may change the While loop structure node into a combination structure node that combined the While loop structure node and a sequence structure node.

In another embodiment the user may be able to request that frames of a sequence structure node be combined with other kinds of structure nodes. For example, each frame in the sequence structure node may be combined with a different kind of structure node. For example, consider a sequence structure node in which Frame 0 is combined with an event structure node, Frame 1 is combined with a For loop structure node, and Frame 2 is combined with a timed loop structure node. This may be useful, for example, to implement a graphical program that performs a simulation in sequence. Frame 0 may implement a repeating event structure to handle user interface aspects of entering simulation data. Frame 1 may implement a For Loop that iterates over the items that the user provides to create a profile for the simulation. Frame 2 may implement a Timed Loop that runs the simulation in real-time.

To further illustrate the concept of a combination structure node according to one embodiment, consider a combination structure node that combines a timed loop structure node and a timed sequence structure node. For many applications it is necessary to perform a timed sequence of sub-tasks repetitively in a loop, where the timing of each iteration of the loop and the timing of the sub-tasks performed at each iteration are precisely controlled. In one embodiment the user may accomplish this by including a separate timed sequence structure node within a separate timed loop structure node. The user may configure the timing of the timed loop structure node and the timed sequence structure node so that the frames of the timed sequence structure node execute with the desired timing at each repetition of the timed loop.

However, in another embodiment the graphical programming development environment may provide a combination structure node that integrates functionality of the timed loop structure node and the timed sequence structure node. This may simplify the graphical program and make it easier for the user to configure the desired timing. Having a single structure that provides the combined functionality of the timed loop structure node and the timed sequence structure node may also allow the graphical program to execute more efficiently, since a single execution system can manage the execution of the frames of the timed sequence structure within the timed loop.

Figure 10:
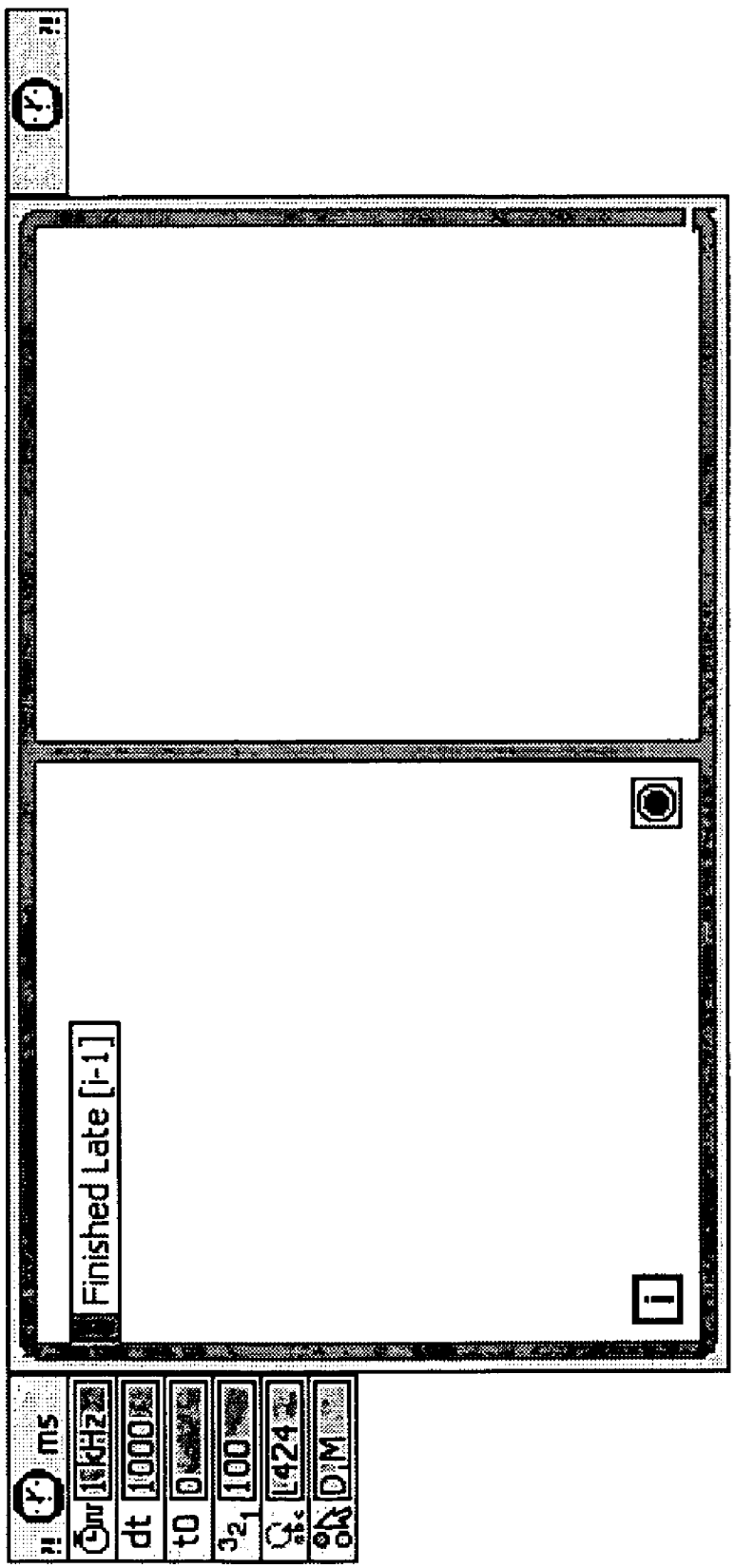
FIG. 10 illustrates an exemplary combination structure node that combines functionality of a timed loop structure node and a timed sequence structure node, where the combination structure node includes two frames.

In one embodiment a timed loop structure node may by default have a single frame. The user may create additional frames if the user desires a timed sequence of sub-tasks to execute at each iteration of the timed loop. For example, the user may invoke a popup menu with menu items such as "Add Frame Before" and "Add Frame After" to create an additional frame. For example, selecting the "Add Frame After" menu item on an empty timed loop structure node would result in a two frame loop such as shown in FIG. 10. The menu may also include a "Delete This Frame" menu item that allows the removal of a frame from the loop. Within each frame of the timed loop, the user may include a portion of graphical source code to be performed to implement a sub-task. Thus, at each repetition of the timed loop, the portions of graphical source code in the frames may execute sequentially according to the ordering of the frames.

The combination structure node may also allow the user to configure timing of both the timed loop itself and the frames within the timed loop, e.g., by statically setting timing information and/or configuring timing information to be set dynamically during execution of the graphical program. For example, configuration options and feedback available for a timed loop with multiple frames may comprise a union of the options and feedback available for an individual timed loop structure node and timed sequence structure node. This includes static configuration through the combination structure node's configuration dialog (i.e. 'Configure Timed Loop' menu item) and runtime configuration and feedback using data nodes associated with the combination structure node.

Figure 11:
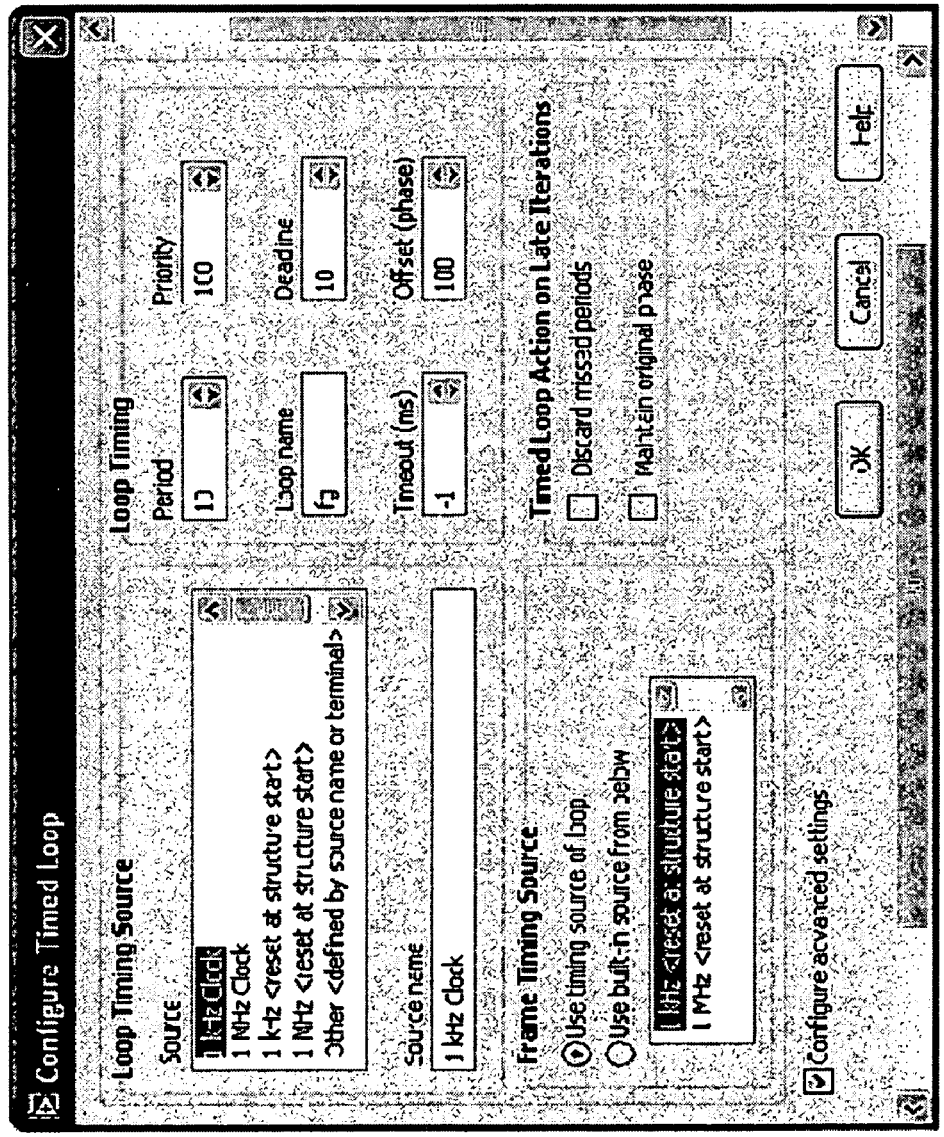
FIG. 11 illustrates an exemplary dialog for configuring the timed loop control flow function of the combination structure node of FIG. 10.
Figure 12:
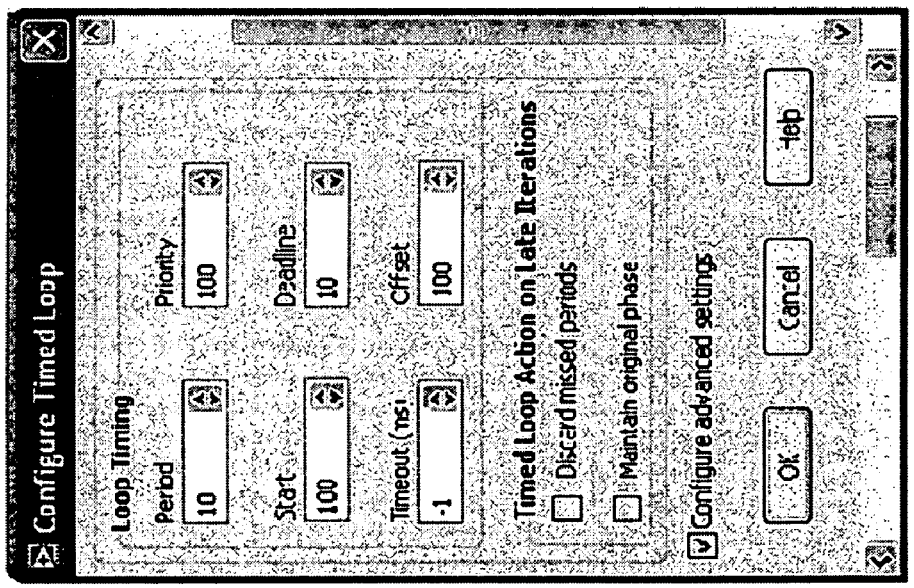
FIG. 12 illustrates an exemplary dialog for configuring the right data node within each frame of the combination structure node of FIG. 10.

Static configuration dialogs may be provided for configuring the timing of the loop as a whole as well as for individual frames. FIG. 11 illustrates an exemplary dialog for configuring the timed loop as a whole. As shown, the dialog provides controls for specifying timing information for the timed loop, such as a timing source, period, priority, etc. FIG. 12 illustrates an exemplary dialog for configuring the right data node within each frame of the timed loop. As shown, the dialog provides controls for specifying timing information for the next frame. Note that the right data node of the last frame provides configuration for the execution of the first frame during the next iteration. The left data node of the first frame provides feedback from the execution of the last frame during the previous iteration. Also note that the set of elements available through a given data node may change as frames are added or deleted at the ends of the sequence. Controls for specifying the period, offset, and late mode may only appear or may only be enabled on the dialog for the last frame in the timed loop, since these properties affect timing for the next iteration of the timed loop. On the other hand, the control for specifying the "Start" may appear or may be enabled on the dialog for all frames except the last frame.

Execution of individual frames within the timed loop may have the same semantics as the execution of frames within a timed sequence structure node. Execution of the frames may proceed from left to right with the contents of frame 'i' completing before anything in frame 'i+1' executes. The time at which a frame begins execution is controlled primarily by its 'Start' value, though execution may begin late if code which must execute before the frame does not complete in time.

The timing source for the individual frames may be the same as that of the overall timed loop or it may be a different timing source. If it is the same as the overall loop, the user should ensure that the sum of each frame's period does not exceed the overall timed loop's period. In one embodiment the graphical programming development environment may indicate an error condition to the user if this is not the case.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible memory medium for creating a graphical program, the memory medium comprising program instructions executable to:
   include a first node in the graphical program, wherein the first node is configured to perform two or more control flow functions prior to association of graphical code with the first node, wherein the first node is a single node selected by a user via a graphical user interface (GUI), wherein the first node has an appearance that visually indicates the capability to perform two or more control flow functions and an identification of the two or more control flow functions, and wherein the two or more control flow functions comprise two or more of: iteration, looping, conditional branching, sequencing, timed execution, and event-driven execution; and associate a first graphical code portion with the first node in response to input by a user via a GUI;

wherein the first node causes the first graphical code portion to execute according to the two or more control flow functions during execution of the graphical program.

2. The memory medium of claim 1, wherein the two or more control flow functions comprise two or more of: iteration, looping, conditional branching, sequencing, timed execution, and event-driven execution;

wherein the first node causes the first graphical code portion to execute according to the two or more of: iteration, looping, conditional branching, sequencing, timed execution, and event-driven execution.

3. The memory medium of claim 1, wherein the two or more control flow functions comprise iteration and sequencing;

wherein the first node causes the first graphical code portion to execute according to iteration and sequencing.

4. The memory medium of claim 1, wherein the first graphical code portion comprises a plurality of interconnected nodes that visually indicate functionality of the first graphical code portion.

5. The memory medium of claim 1, wherein the first node includes an interior portion;

wherein said associating the first graphical code portion with the first node comprises placing the first graphical code portion in the interior portion of the first node.

6. The memory medium of claim 1, wherein the two or more control flow functions include a first control flow function and a second control flow function;

wherein the graphical program is associated with a graphical programming development environment;

wherein the graphical programming development environment provides a second node operable to perform the first control flow function and a third node operable to perform the second control flow function;

wherein the first node combines functionality of the second node and the third node into a single node.

7. The memory medium of claim 1, wherein the program instructions are further executable to:

display a graphical user interface (GUI) for configuring the first node; and receive user input to the GUI to configure the first node, wherein said configuring the first node comprises configuring one or more of the control flow functions performed by the first node.

8. A computer-accessible memory medium for creating a graphical program, the memory medium comprising program instructions executable to:

display a first node in the graphical program, wherein the first node specifies two or more control flow functions prior to association of graphical code with the first node, wherein the first node is a single node selected by a user via a graphical user interface (GUI), wherein the first node has an appearance that visually indicates the capability to perform two or more control flow functions and an identification of the two or more control flow functions, and wherein the two or more control flow functions comprise two or more of: iteration, looping, conditional branching, sequencing, timed execution, and event-driven execution; and associate a first graphical code portion with the first node in response to input by a user via a GUI;

wherein during execution of the graphical program, the first node causes the first graphical code portion to execute according to the two or more control flow functions.

9. The memory medium of claim 8, wherein the first node specifies iteration and sequencing of the first graphical code portion.

10. A computer accessible memory medium storing a node for use in a graphical program, the node comprising:

an icon that is displayed on a display of a computer system, the icon comprising:

a border visually indicating the control flow function of iteration;

two or more frames for receiving different respective graphical code portions, wherein the frames define a sequential order of execution for the different respective graphical code portions;

wherein the memory medium further stores program instructions configured to cause the graphical code portions to execute for a plurality of iterations, wherein for each iteration, the graphical code portions execute in the sequential order defined by the frames;

wherein the node is configured to perform the iterations and the sequential order prior to association of graphical code portions, wherein the node is associated with the graphical code portions in response to input by a user via a graphical user interface (GUI) wherein the node is selected by a user via a GUI, and wherein the node has an appearance that visually indicates the capability to perform two or more control flow functions and an identification of the two or more control flow functions, and wherein the two or more control flow functions comprise two or more of: iteration, looping, conditional branching, sequencing, timed execution, and event-driven execution.

11. A computer-implemented method for creating a graphical program, the method comprising:

including a first node in the graphical program, wherein the first node is configured to perform two or more control flow functions prior to association of graphical code with the first node, wherein the first node is a single node selected by a user via a graphical user interface (GUI), and wherein the first node has an appearance that visually indicates the capability to perform two or more control flow functions and an identification of the two or more control flow functions, and wherein the two or more control flow functions comprise two or more of: iteration, looping, conditional branching, sequencing, timed execution and event-driven execution; and associating a first graphical code portion with the first node in response to input by a user via a GUI;

wherein the first node causes the first graphical code portion to execute according to the two or more control flow functions during execution of the graphical program.

12. The method of claim 11, wherein the two or more control flow functions comprise two or more of: iteration, looping, conditional branching, sequencing, timed execution, and event-driven execution;

wherein the first node causes the first graphical code portion to execute according to the two or more of: iteration, looping, conditional branching, sequencing, timed execution, and event-driven execution.

13. The method of claim 11,
wherein the two or more control flow functions comprise iteration and sequencing;
wherein the first node causes the first graphical code portion to execute according to iteration and sequencing.

14. The method of claim 11,
wherein the first node includes an interior portion;
wherein said associating the first graphical code portion with the first node comprises placing the first graphical code portion in the interior portion of the first node.

15. The method of claim 11,
wherein the two or more control flow functions include a first control flow function and a second control flow function;
wherein the graphical program is associated with a graphical programming development environment;
wherein the graphical programming development environment provides a second node operable to perform the first control flow function and a third node operable to perform the second control flow function;
wherein the first node combines functionality of the second node and the third node into a single node.

16. The method of claim 11, further comprising:
displaying a graphical user interface (GUI) for configuring the first node; and
receiving user input to the GUI to configure the first node, wherein said configuring the first node comprises configuring one or more of the control flow functions performed by the first node.

* * * * *